(12) United States Patent
Ocher et al.

(10) Patent No.: US 10,680,845 B2
(45) Date of Patent: Jun. 9, 2020

(54) INTERNET OF THINGS DEVICE INTERFACE

(71) Applicant: SAP SE, Walldorf (DE)

(72) Inventors: Alexander Ocher, San Francisco, CA (US); Viktor Lapitski, San Francisco, CA (US)

(73) Assignee: SAP SE, Walldorf (DE)

( * ) Notice: Subject to any disclaimer, the term of this patent is extended or adjusted under 35 U.S.C. 154(b) by 69 days.

(21) Appl. No.: 15/829,331

(22) Filed: Dec. 1, 2017

(65) Prior Publication Data

US 2019/0173684 A1     Jun. 6, 2019

(51) Int. Cl.
*H04L 12/28*     (2006.01)
*H04L 29/08*     (2006.01)

(52) U.S. Cl.
CPC ........... *H04L 12/281* (2013.01); *H04L 67/12* (2013.01); *H04L 2012/285* (2013.01)

(58) Field of Classification Search
CPC .. H04L 12/281; H04L 67/12; H04L 2012/285
See application file for complete search history.

(56) References Cited

U.S. PATENT DOCUMENTS

| | | | | |
|---|---|---|---|---|
| 2004/0199320 | A1* | 10/2004 | Harada | B60K 23/08 701/69 |
| 2013/0038897 | A1* | 2/2013 | Heckler | H04L 67/16 358/1.15 |
| 2016/0248746 | A1* | 8/2016 | James | H04W 4/70 |
| 2016/0358722 | A1* | 12/2016 | Lakshmanan | H01H 9/54 |
| 2017/0242557 | A1* | 8/2017 | Rotschield | G06F 3/04817 |
| 2017/0357529 | A1* | 12/2017 | Venkatraman | H04L 67/22 |
| 2018/0116004 | A1* | 4/2018 | Britt | H04W 40/125 |

\* cited by examiner

*Primary Examiner* — Angela Nguyen
(74) *Attorney, Agent, or Firm* — Sterne, Kessler, Goldstein & Fox P.L.L.C.

(57) ABSTRACT

Disclosed herein are system, method, and computer program product embodiments for interfacing with and managing IoT devices. An embodiment operates by requesting a list of device-specific capabilities from one or more IoT devices, providing a user interface by which users can view all available capabilities across the one or more IoT devices, and receiving a selected capability which subsequently executes on the appropriate IoT device.

20 Claims, 3 Drawing Sheets

INTERNET OF THINGS DEVICE INTERFACE

BACKGROUND

Generally speaking, the Internet of Things (IoT) is an immense (and growing) collection of computing devices embedded with network connectivity. IoT devices perform numerous, varied practical functions in homes, automobiles, businesses, wearable technologies, medical machinery, buildings, factories, grids, power plants, infrastructure, and vending machines, to name just a limited number of examples. A given environment, such as a person's home, can include a multitude of IoT devices, each device capable of performing unique device-specific functions. Frequently, these IoT devices provide user interfaces by which owners can access the devices via a web-browser on a computer workstation or from a mobile device in order to check the device's status and remotely perform any available device-specific capabilities.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for interfacing with and managing computing devices, such as but not limited to Internet of Things (IoT) devices. While embodiments are described herein using the example of IoT, it should be understood that this disclosure is applicable to any computing and/or network capable device, apparatus, system, method, application, combination, sub-combination, hardware and/or software.

Figure 1:
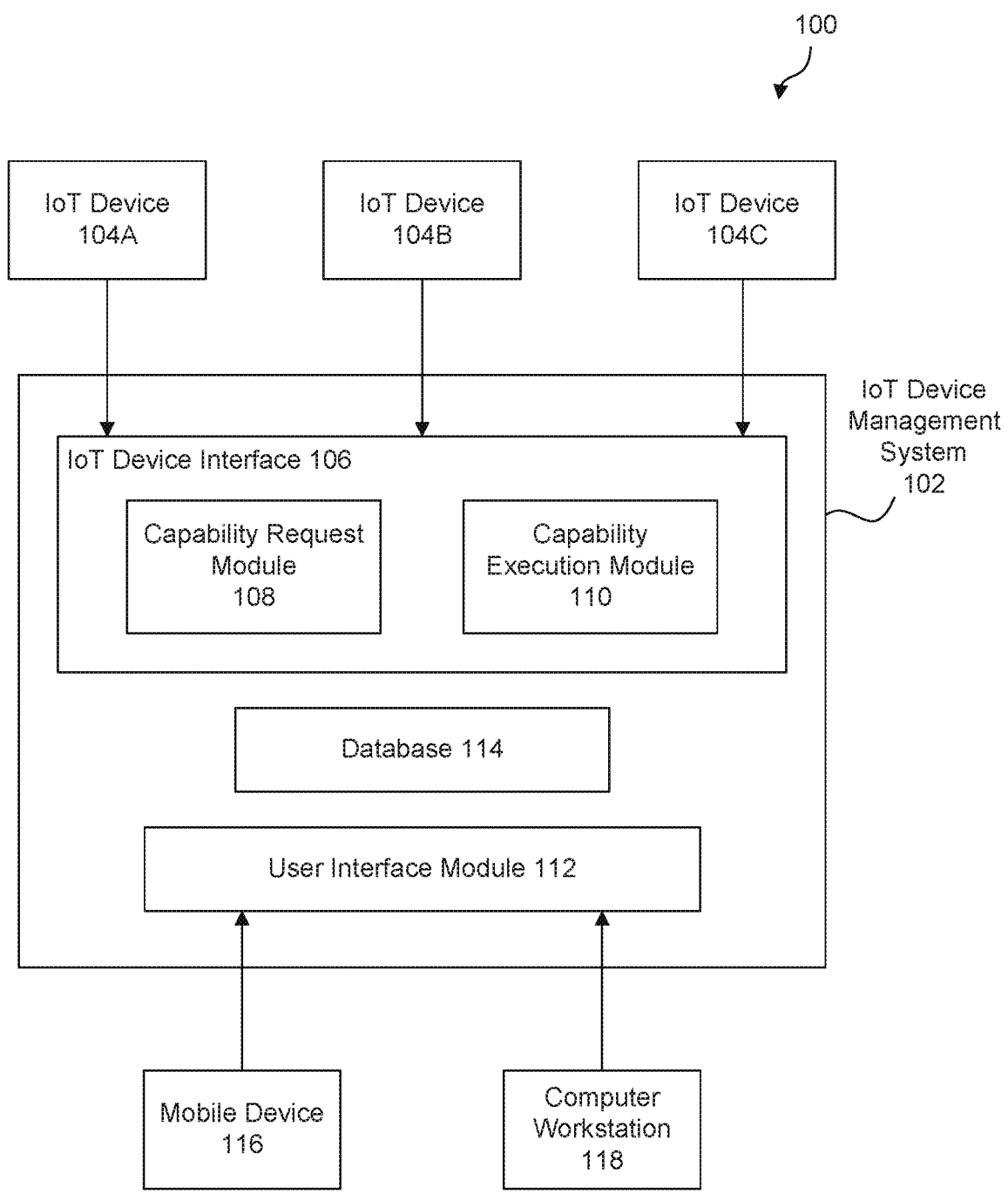
FIG. 1 is a block diagram of an IoT device management system, according to some embodiments.

FIG. 1 is a block diagram illustrating an environment 100 having an IoT device management system 102, according to some embodiments. Any operations or operational flow depicted herein may be executed sequentially in any order, or they may alternatively be executed concurrently, with more than one operation being performed simultaneously, or any combination of the above.

Any operation herein may be performed by any type of structure in the diagram, such as a module or dedicated device, in hardware, software, or any combination thereof. Any block in the block diagram of FIG. 1 may be regarded as a module, apparatus, dedicated device, general-purpose processor, engine, state machine, application, functional element, or related technology capable of and configured to perform its corresponding operation(s) described herein.

Environment 100 includes IoT device management system 102, IoT devices 104, mobile device 116, and computer workstation 118. IoT device management system 102 includes IoT device interface 106, user interface module 112, and database 114. IoT device interface 106 includes capability request module 108 and capability execution module 110.

In some embodiments, IoT device management system 102 communicates with IoT devices 104 through a standardized application programming interface. IoT device management system 102 catalogues information about IoT devices 104 in environment 100 and provides a user-facing application through which IoT devices 104 can be managed, organized, and controlled. By standardizing interactions between IoT device management system 102 and IoT devices 104, IoT devices 104 in environment 100 can be managed from a unitary location, without each IoT device 104 requiring a distinct webpage or interface. Moreover, a manufacturer of IoT device 104 can eschew operating a particularized website or mobile application and instead rely on IoT device management system 102. Additionally, IoT device management system 102 automatically discovers any new functionality that becomes available on IoT device 104. One skilled in the relevant arts will understand that a further advantage of this standardization is that IoT devices 104 can be from different manufacturers and utilize different hardware or operating systems without impacting IoT device management system 102. Furthermore, IoT device management system 102 facilitates rapid prototyping for IoT devices 104 and allows distributed development and virtual testing/inspection.

In some embodiments, IoT devices 104 are computing devices equipped with electronics, software, and network accessibility. IoT devices 104 can be physical or virtual devices. In some embodiments, IoT devices 104 can be software applications. In addition to the essential function(s) that IoT devices 104 perform, IoT devices 104 connect to the Internet or other network infrastructure in order to exchange data, provide ancillary functionality, and enhance management convenience. In an embodiment, IoT devices 104 are home appliances such as thermostats, smart dishwashers, smart laundry machines, home security devices, smart light switches, etc. In other embodiments, IoT devices 104 are any physical devices performing a primary function while also being embedded with electronics, software, and network connectivity enabling a connection to the Internet or network infrastructure. An exemplary environment 100 may have one, few, many, or a myriad of IoT devices 104 contained therein.

A given IoT device 104, such as IoT device 104A, may possess unique capabilities, distinct from the capabilities possessed by other IoT devices 104B, 104C. For example, an IoT device 104A that is a dishwasher may be capable of the following functions: "check status," "open door," and "pause wash," while an IoT device 104B that is a thermostat could provide different capabilities such as: "set temperature," "toggle fan," and "turn on/off air conditioning." These functionalities could vary greatly across the multitude of IoT devices 104.

In some embodiments, IoT device interface 106 provides a communication protocol or application programming interface by which IoT device management system 102 exchanges data and communicates with IoT devices 104. IoT device interface 106 includes capability request module 108 and capability execution module 110. The communications are standardized across IoT devices 104, which enables IoT device interface 106 to communicate with any IoT device 104A providing the standardized functions and methods anticipated by IoT device management system 102's application programming interface.

This standardization allows IoT device management system 102 to avoid storing, cataloguing, or understanding specific, unique information about any IoT devices 104A and its capabilities (no anticipation) while interacting with any IoT devices 104A as long as IoT devices 104A can reply to the request for capabilities, which is common for supported devices. In other words, no device management logic persists in IoT device management system 102, other than the ability to send web services commands and receive replies using the standardized format as defined by the application programming interface.

In some embodiments, for security reasons, IoT device management system 102 does not send any code for installation on IoT device 104A to modify its operations.

In some embodiments, capability request module 108 formulates a network request, transmits the network request to an IoT device 104 (such as IoT device 104A, for example), and receives a response in return. In an embodiment, the network request is an appropriately formed HTTP or HTTPS request or a message in another suitable communication protocol. The HTTP or HTTPS request embeds an anticipatorily formatted JSON string that indicates to IoT device 104A that capability request module 108 requests IoT device 104A's capabilities. Capability request module 108 communicates with IoT device 104A using the Internet or other public network. The specific additional contents of a validly formed HTTP or HTTPS request will be apparent and understood by one skilled in the arts. IoT device 104A answers with a web response detailing the available functionalities specific to that device 104A. Capability request module 108 receives and parses the response from IoT device 104A. An IoT device 104A can return all capabilities available on the device via the web response, or any subset thereof. Capability request module 108 stores the information about IoT device 104A and the capabilities and associated parameters in database 114 for later recall by IoT device management system 102.

Capability execution module 110 sends an execution request to IoT device 104A. An execution request specifies the function, activity, or capability that IoT device 104A should perform. In an embodiment, the execution request is human-readable, machine-interpretable text in the form of attribute value pairs. As one skilled in the arts will appreciate, such human-readable, machine-interpretable text can be achieved using JSON strings, XML, or other appropriate textual format. In an embodiment, capability execution module 110 forms an appropriately formatted network request consisting of the JSON-style string and transmits the request to an IoT device 104A. The appropriate action subsequently transpires on IoT device 104A. The exact contents, e.g., the header, footer, body, etc. of a such a validly formed HTTP or HTTPS request will be appreciated and understood by one skilled in the arts. In an embodiment, the action can be delayed according to a user-inputted delay value, in order to get the action to transpire at a later point in time. In an embodiment, capability execution module 110 sends multiple requests or a series of requests in order to execute the selected capability. While the above has been described with reference to IoT device 104A for example purposes, the description applies equally well to any IoT device 104.

User interface module 112 includes one or more servers processing web-based traffic and HTTP or HTTPS request methods from a user of mobile device 114 and/or computer workstation 116. User interface module 112 serves appropriate HTML web pages or other suitable viewable format to a user of mobile device 116 and/or computer workstation 118. Front-end servers in user interface module 112 employ a standard web server technology, for instance Microsoft IIS or Apache, to listen for, process, and respond to any of these incoming hits/requests. In some embodiments, user interface module 112 returns pages to the users via HTTP or HTTPS, which user interface module 112 formulates in accordance with hypertext transfer protocol W3C standards. The returned pages also include stylesheets, scripts, images, and video, audio, or other multimedia files, the content and nature of which will be appreciated and understood by those skilled in the relevant arts. In other embodiments, user interface module 112 specifically formats the responses for viewing on a mobile device in adherence with W3C mobile web best practices.

User interface module 112 tracks user-associated information and login credentials. Users must create an account in IoT device management system 102 via user interface module 112 and log into their account to utilize IoT device management system 102. In an embodiment, user interface module 112 provides analytics services to leverage the data collected about various users, IoT devices 104, environment 100, etc. In an embodiment, user interface module 112 displays collected historical data about previously executed network requests, capability requests, capability executions, etc. For each IoT device 104A, a user can access historical and analytical data for that particular IoT device 104A.

User interface module 112 displays a list of registered IoT devices 104. In an embodiment, user interface module 112 groups IoT devices 104 by a location within environment 100, alphabetically, or according to another appropriate categorization methodology. User interface module 112 allows a user to view the available capabilities and functions for IoT devices 104. User interface module 112 receives a user-selected capability for a given IoT device 104 and any needed parameters, then passes this information to capability execution module 110. In an embodiment, user interface module 112 receives a user-selected capability in multiple stages, with stages entered on the same screen or in multiple request-response screens with capabilities dynamically changing between screens (sub-menus, etc.)

In an embodiment, database 114 is a relational database harnessing any commercially available database management system such as SAP HANA, SAP IQ, Microsoft Access, Microsoft SQL server, an Oracle database, an IBM database, etc. In an embodiment, database 114 implements a centralized storage area network (SAN), network-attached storage (NAS), redundant array of independent disks, and/or any other configuration of storage devices to supply sufficient storage capacity to store the needed database tables and supporting structures. Sufficient storage alternatively exists in any other physically attached magnetic storage, cloud storage, or additional storage medium. In an embodiment, database 114 deploys a commonly utilized hard-disk interface, such as ATA, SATA, SCSI, SAS, and/or fibre for interfacing with any storage mediums.

Mobile device 116 and/or computer workstation 118 are utilized by users of IoT devices 104 to manage, organize, and control IoT devices 104 via IoT device management system 102. Mobile device 116 and computer workstation 118 connect to IoT device management system 102 via the Internet or other public network.

Figure 2:
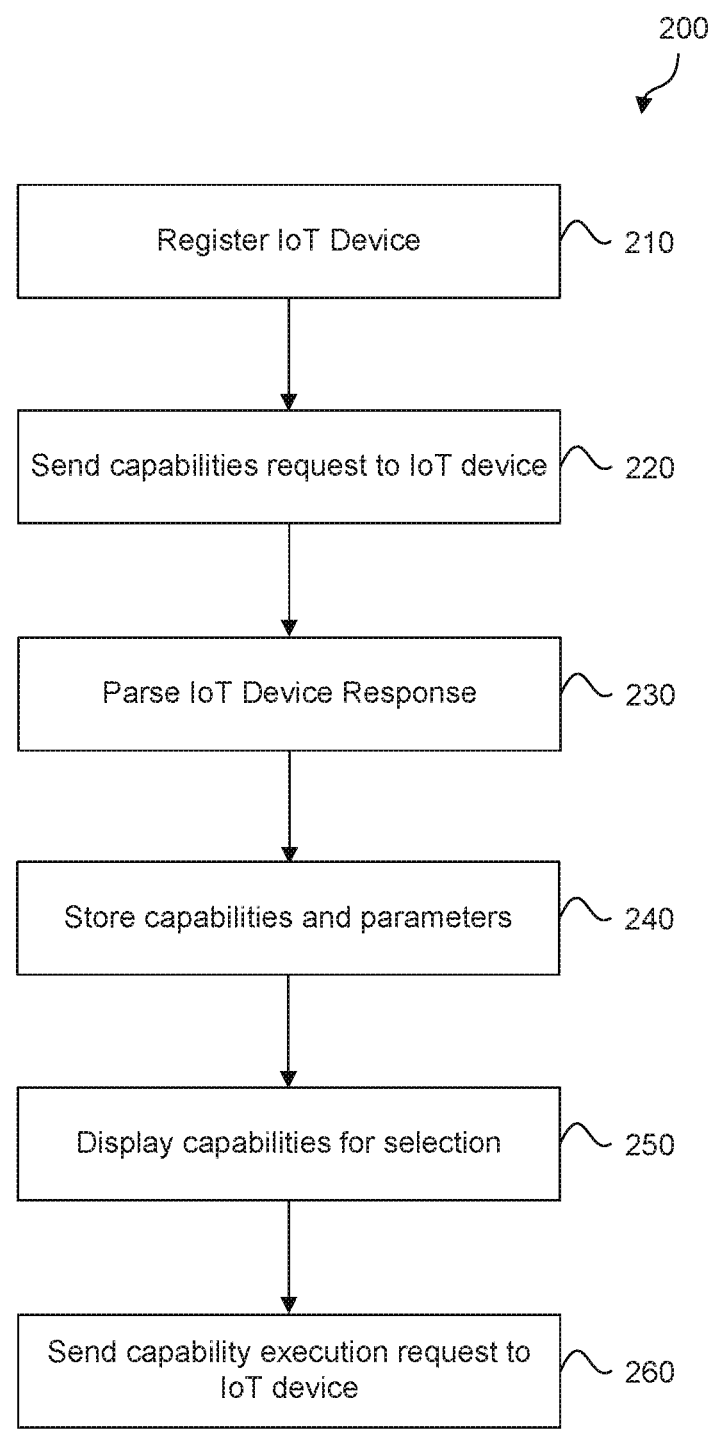
FIG. 2 is a flowchart illustrating a process for executing a capability on an IoT device, according to some embodiments.

FIG. 2 is a flowchart of a method 200 for executing a capability or function on IoT device 104. Method 200 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 2, as will be understood by a person of ordinary skill in the art.

Method 200 shall be described with reference to IoT device 104A in FIG. 1. However, method 200 is not limited to that example embodiment, and applies equally well to any IoT device 104.

In 210, IoT device management system 102 registers IoT device 104A. In an embodiment, the registration process connects IoT device 104A to the owner's account, through a manual, automatic, or hybrid process. For example, IoT device 104A may scan a quick-response code, barcode, or other machine-readable optical label associated with the owner, automatically connect to the system, and register itself. In an embodiment, IoT device management system 102 receives manually inputted data from a user to register IoT device 104A. In such an embodiment, the device-identifying characteristics received from the user may include: unique identifier, name, description, type, location, function, serial number, manufacturer, model, firmware version, and/or other suitable attributes. IoT device management system 102 stores these characteristics in database 114 in an appropriately designed schema. IoT device management system 102 also identifies and associates IoT device 104A with an IP address, public key, private key, certificate, or other cataloguing and authentication method. In an alternate embodiment, IoT device management system 102 registers IoT device 104A automatically when IoT device 104A connects to the Internet, or registers IoT device 104A when IoT device 104A accesses a particular URL or web address. By registering IoT device 104A in 210, IoT device management system 102 creates a record of IoT device 104A's existence in environment 100.

In 220, IoT device management system 102 sends a capabilities request to IoT device 104A. The capabilities request queries the service set, i.e., the capabilities or functions that are available on IoT device 104A. Each IoT device 104 may possess a unique set of capabilities. In an embodiment, IoT device management system 102 sends the request to IoT device 104A in human-readable text consisting of a standardized, anticipated attribute value pair (i.e, JSON or XML) such as: {"CMD": "GetOperations" }. A system-compliant IoT device 104A will respond with a web response detailing the available functionalities specific to IoT device 104A.

In 230, IoT device management system 102 parses the response received from IoT device 104A in response to the capabilities request sent in 220. In an embodiment, IoT device 104A replies with a web response in a format common across the IoT devices 104. In an embodiment, the reply includes: code of operation, description of operation, number of input parameters, and/or number of output parameters. For example, IoT device management system 102 could receive the following list of capabilities or data object embedded in the web response received from an IoT device 104A:

[
{"opcode":"FanOp","description":"fan on or off","in_params":"1", "out_params":"0"},
{"opcode":"GetTime","description":"get time","in_params":"0", "out_params":"1")},
{"opcode":"SetTime","description":"set time","in_params":"1", "out_params":"0"},
].

IoT device management system 102 parses the response to determine the capabilities available on IoT device 104A and the number of parameters that need to be passed to IoT device 104A in order to execute the capability.

In 240, IoT device management system 102 executes appropriate commands to store the capabilities and parameters received in 230 in database 114. In an embodiment, 240 stores the information about IoT devices 104, the capabilities, and the parameters in database tables, which can be housed in any commercially available database management system such as SAP HANA, SAP IQ, Microsoft Access, Microsoft SQL server, an Oracle database, an IBM database, etc. In an embodiment, this entails executing transact-SQL or other structured query language to insert, update, delete, or otherwise modify database 114.

In order to facilitate automatic extendibility and discovery of additional capabilities or functions of each IoT device 104, it may be advantageous to execute 220, 230, and 240 across the registered IoT devices 104 periodically, e.g., once every hour, day, week, month, etc. Alternatively, it may be advantageous to execute 220 for registered IoT devices 104 whenever a user examines user interface module 112 or when the user executes a "refresh" function via user interface module 112. Executing 220, 230, and 240 periodically ensures that IoT device management system 102 automatically discovers any capabilities added to any of IoT devices 104 over time.

In 250, user interface module 112 displays an HTML webpage, or other suitable viewable format, information about registered IoT devices 104, their capabilities, and any associated parameters to a user of mobile device 114 or computer workstation 116. In 250, user interface module 112 receives from the user a selection of a particular capability to execute on a given IoT device 104 (such as IoT device 104A, for example) and any parameters needed to execute that capability. In an exemplary embodiment, user interface module 112 could receive a user selection to execute the "SetTemperature" functionality on a thermostat IoT device 104A and a corresponding integer representing the temperature to set the thermostat to. The associated parameters can be a scalar, e.g., a character, an integer, a string, other single data type or variable, or a composite or compound data type, such as a struct, class, array, list, or any data structure containing multiple fields.

In 260, IoT device management system 102 sends a capability execution request to the IoT device 104A (that was the subject of the user selection in 250) in order to execute the capability. This capability execution request can be human-readable, machine-interpretable text that includes attribute value pairs (e.g., JSON, XML, etc.). For an exemplary operation request to a thermostat that sets the temperature to 72 degrees, the parameters could include: [{"CMD":"SetTemperature"},{"Temp":"72"}]. If the exemplary thermostat required a third parameter indicating the scale to use, the exemplary parameters could read: [{"CMD":"SetTemperature"},{"Temp":"72"},{"Scale": "Farenheit"}]. Passing an appropriately formatted execution request to IoT device 104A causes the capability to be executed on IoT device 104A. The exact additional contents of a such a validly formed HTTP or HTTPS request will be understood by one skilled in the arts. IoT device management system 102 can receive the result of the operation from IoT device 104A, indicating a success or failure of the capability execution request.

Figure 3:
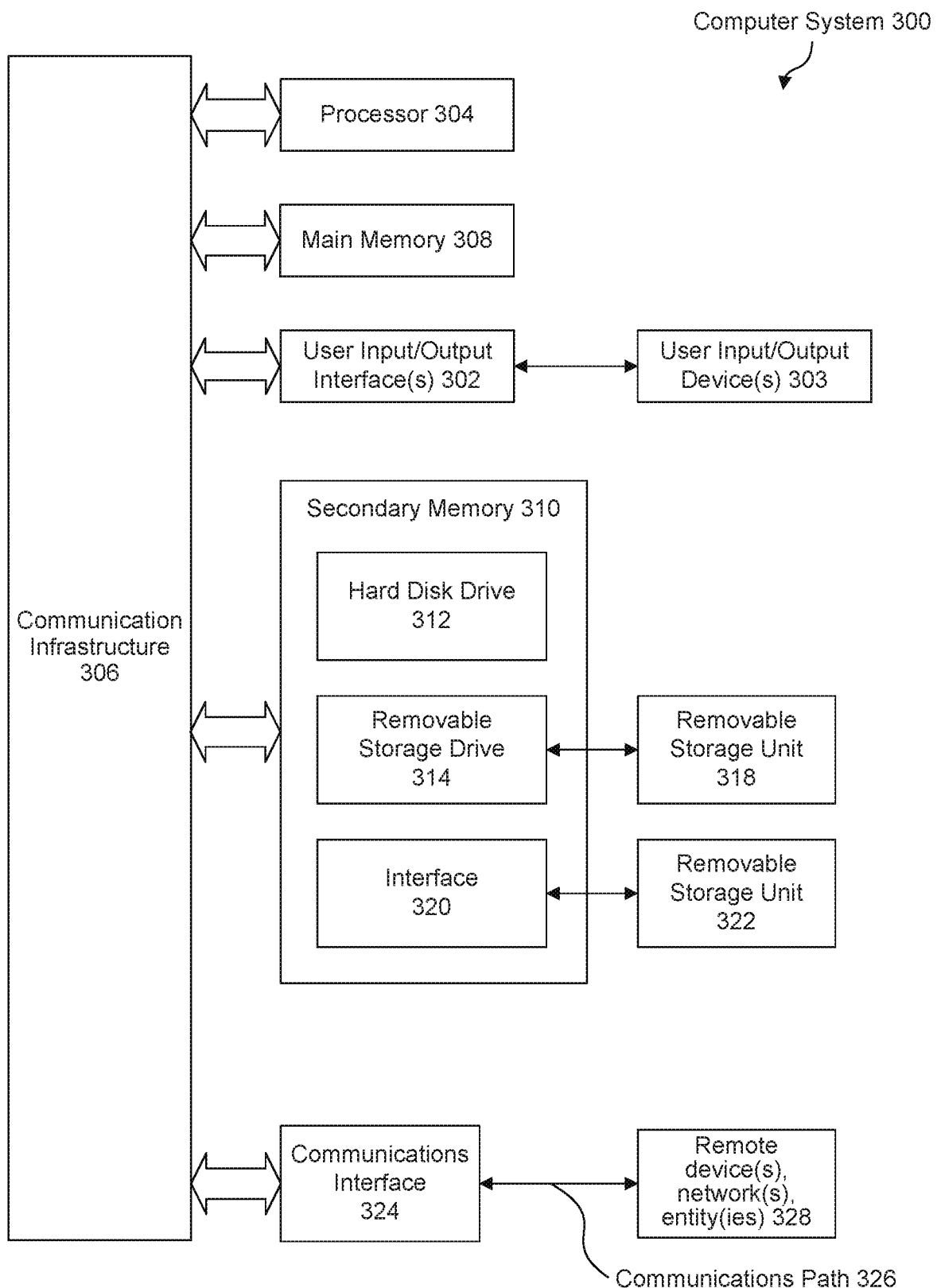
FIG. 3 is an example computer system useful for implementing various embodiments.

Various embodiments may be implemented, for example, using one or more well-known computer systems, such as computer system 300 shown in FIG. 3. One or more computer systems 300 may be used, for example, to implement any of the embodiments discussed herein, as well as combinations and sub-combinations thereof.

Computer system 300 may include one or more processors (also called central processing units, or CPUs), such as a processor 304. Processor 304 may be connected to a communication infrastructure or bus 306.

Computer system 300 may also include user input/output device(s) 303, such as monitors, keyboards, pointing devices, etc., which may communicate with communication infrastructure 306 through user input/output interface(s) 302.

One or more of processors 304 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 300 may also include a main or primary memory 308, such as random access memory (RAM). Main memory 308 may include one or more levels of cache. Main memory 308 may have stored therein control logic (i.e., computer software) and/or data.

Computer system 300 may also include one or more secondary storage devices or memory 310. Secondary memory 310 may include, for example, a hard disk drive 312 and/or a removable storage device or drive 314. Removable storage drive 314 may be a floppy disk drive, a magnetic tape drive, a compact disk drive, an optical storage device, tape backup device, and/or any other storage device/drive.

Removable storage drive 314 may interact with a removable storage unit 318. Removable storage unit 318 may include a computer usable or readable storage device having stored thereon computer software (control logic) and/or data. Removable storage unit 318 may be a floppy disk, magnetic tape, compact disk, DVD, optical storage disk, and/any other computer data storage device. Removable storage drive 314 may read from and/or write to removable storage unit 318.

Secondary memory 310 may include other means, devices, components, instrumentalities or other approaches for allowing computer programs and/or other instructions and/or data to be accessed by computer system 300. Such means, devices, components, instrumentalities or other approaches may include, for example, a removable storage unit 322 and an interface 320. Examples of the removable storage unit 322 and the interface 320 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 300 may further include a communication or network interface 324. Communication interface 324 may enable computer system 300 to communicate and interact with any combination of external devices, external networks, external entities, etc. (individually and collectively referenced by reference number 328). For example, communication interface 324 may allow computer system 300 to communicate with external or remote devices 328 over communications path 326, which may be wired and/or wireless (or a combination thereof), and which may include any combination of LANs, WANs, the Internet, etc. Control logic and/or data may be transmitted to and from computer system 300 via communication path 326.

Computer system 300 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 300 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 300 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 300, main memory 308, secondary memory 310, and removable storage units 318 and 322, as well as tangible articles of manufacture embodying any combination of the foregoing. Such control logic, when executed by one or more data processing devices (such as computer system 300), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 3. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method, comprising:
   registering, by the IoT device management system, an IoT device that provides one or more device-specific capabilities in response to receiving a scanned optical label associated with an owner;
   sending a first network request to the IoT device periodically to discover a new device-specific capability provided by the IoT device;
   receiving from the IoT device in response to the first network request, a response identifying the new device-specific capability supported by the IoT device;
   providing a user interface enabling a user to select a capability from among the one or more device-specific capabilities and the new capability for the IoT device; and
   sending a second network request to the IoT device,
      wherein the second network request indicates the selected capability,
      wherein the IoT device executes the selected capability in response to the second network request, and
      wherein at least one of the sending, receiving, storing, and providing are performed by one or more computers.

2. The method of claim 1, wherein the IoT device is a home appliance.

3. The method of claim 1, the providing further comprising:
   displaying identifying characteristics of the IoT device, the one or more device-specific capabilities, and the new capability on a mobile-device friendly user interface.

4. The method of claim 1, further comprising:
   automatically registering the IoT device when the IoT device connects to the Internet.

5. The method of claim 1, wherein the response further comprise parameters associated with the one or more device-specific capabilities.

6. The method of claim 5, wherein the second network request further comprises the parameters.

7. A system, comprising
   a memory;
   at least one processor coupled to the memory and configured to:
      register an IoT device that provides one or more device-specific capabilities in response to receiving a scanned optical label associated with an owner;
      send a first network request to the IoT device periodically to discover a new device-specific capability provided by the IoT device;
      receive from the IoT device in response to the first network request, a response identifying the new device-specific capability supported by the computing device;
      provide a user interface enabling a user to select a capability from among the one or more device-specific capabilities and the new capability for the IoT device; and
      send a second network request to the IoT device,
      wherein the second network request indicates the selected capability, and
      wherein the IoT device executes the selected capability in response to the second network request.

8. The system of claim 7, the at least one processor further configured to:
   store the one or more device-specific capabilities associated with the IoT device in a relational database.

9. The system of claim 7, wherein to provide a user interface the at least one processor is configured to:
   group the IoT device into a category according to a location within an environment; and
   display the IoT device organized by the category.

10. The system of claim 7, wherein to send the second network request the at least one processor is configured to:
    send multiple requests sequentially and in parallel.

11. The system of claim 7, the at least one processor further configured to:
    embed an anticipated attribute-value pair in the first network request to request the new device-specific capability.

12. The system of claim 7, the at least one processor further configured to:
    embed a set of attribute-value pairs indicating the selected capability.

13. The system of claim 7, wherein the computing device is a smart appliance.

14. A non-transitory computer-readable device having instructions stored thereon that, when executed by at least one computing device, causes the at least one computing device to perform operations comprising:
    registering an IoT device that provides one or more device-specific capabilities in response to receiving a scanned optical label associated with an owner;

sending a first network request directly to the IoT device periodically to discover a new device-specific capability provided by the IoT device;

receiving directly from the IoT device in response to the first network request, a response identifying the new device-specific capability supported by the IoT device;

providing a user interface enabling a user to select a capability from among the one or more device-specific capabilities and the new capability for the IoT device; and sending a second network request to the IoT device,
wherein the second network request indicates the selected capability, and
wherein the IoT device executes the selected capability in response to the second network request.

15. The non-transitory computer-readable device of claim 14, the operations further comprising:
registering the IoT device by storing a set of device-identifying characteristics associated with a user.

16. The non-transitory computer-readable device of claim 15, the registering comprising:
providing a domain name to access with the IoT device to auto-register the IoT device.

17. The non-transitory computer-readable device of claim 14, the operations further comprising:
interpreting a task programming language to determine the one or more device-specific capabilities, wherein the task programming language specifies the one or more device-specific capabilities and one or more conditions under which the at least one computing device should send the one more device-specific capabilities to the IoT device.

18. The non-transitory computer-readable device of claim 14, the operations further comprising:
tracking the first network request and the second network request in a set of web-request data used for reporting and analytics.

19. The non-transitory computer-readable device of claim 14, the sending one or more subsequent network requests comprising:
receiving from the user interface a time interval with the selected capability;
delaying for the time interval prior to sending the second network request.

20. The method of claim 1, further comprising:
receiving from the user interface a time interval with the selected capability;
delaying for the time interval prior to sending the second network request.

* * * * *